US008984015B1

(12) United States Patent
Toader

(10) Patent No.: US 8,984,015 B1
(45) Date of Patent: Mar. 17, 2015

(54) METHOD AND APPARATUS FOR DEMAND ASSIGNMENT OF CONTENT DISPLAY OPPORTUNITIES

(75) Inventor: Adrian Toader, Olathe, KS (US)

(73) Assignee: Todpix, LLC, Los Angeles, CA (US)

( * ) Notice: Subject to any disclaimer, the term of this patent is extended or adjusted under 35 U.S.C. 154(b) by 357 days.

(21) Appl. No.: 13/205,122

(22) Filed: Aug. 8, 2011

Related U.S. Application Data

(60) Provisional application No. 61/401,208, filed on Aug. 9, 2010.

(51) Int. Cl.
*G06F 17/30* (2006.01)

(52) U.S. Cl.
USPC ......................................... 707/792

(58) Field of Classification Search
CPC ................................ G06F 17/30056
USPC .................................. 707/792, 720
See application file for complete search history.

(56) References Cited

U.S. PATENT DOCUMENTS

| 4,745,549 | A | 5/1988 | Hashimoto |
| 5,075,771 | A | 12/1991 | Hashimoto |
| 5,848,396 | A | 12/1998 | Gerace |
| 5,950,512 | A | 9/1999 | Fields |
| 5,991,735 | A | 11/1999 | Gerace |
| 7,761,386 | B2 | 7/2010 | Teicher |
| 7,769,673 | B2 | 8/2010 | Brett |
| 7,839,883 | B2 | 11/2010 | Dan et al. |
| 2002/0062236 | A1 | 5/2002 | Murashita et al. |
| 2004/0059643 | A1* | 3/2004 | Marti .............................. 705/26 |
| 2004/0181807 | A1 | 9/2004 | Theiste et al. |
| 2006/0031499 | A1* | 2/2006 | Yoshimine et al. ........... 709/225 |
| 2008/0097826 | A1* | 4/2008 | Leach et al. ..................... 705/10 |
| 2009/0031336 | A1 | 1/2009 | Chavez et al. |
| 2009/0112676 | A1* | 4/2009 | Reich et al. ........................ 705/8 |
| 2009/0125584 | A1* | 5/2009 | Agrawala et al. ............. 709/203 |
| 2009/0217327 | A1* | 8/2009 | Nagano ............................ 725/87 |
| 2010/0058379 | A1 | 3/2010 | Lin et al. |
| 2010/0114643 | A1* | 5/2010 | Redmann et al. ................. 705/9 |

(Continued)

OTHER PUBLICATIONS

Application to Register a Trademark, Trademark/Services Mark Application, Principal Register, Ser. No. 85369870 (Jul. 13, 2011) 7 pgs.

(Continued)

*Primary Examiner* — Apu Mofiz
*Assistant Examiner* — Cindy Nguyen
(74) *Attorney, Agent, or Firm* — Sulzer, Green & Taylor PLLC

(57) ABSTRACT

On-demand scheduling for presentations in movie theatres is enabled by providing users with the ability to communicate content, theatre and time slot selections. The communication can use message or telephone based devices. By tabulating the selections of plural users, selections which will attract an audience greater in number than a predetermined threshold for the presentation in a given venue and time of a particular content can be identified. Feeding this information back to an exhibitor allows the presentation to be implemented. Communicating the fact of the scheduling to the selecting users and others who may also have interest in the presentation multiplies the potential audience. Others who may have an interest in the scheduled presentation include a) individuals associated in a social network with a selecting user and b) individuals registered with social networking or specialty web sites devoted to content which is the same as, or similar to, the scheduled presentation.

31 Claims, 5 Drawing Sheets

(56) References Cited

U.S. PATENT DOCUMENTS

2011/0137690 A1* 6/2011 Louch et al. .................. 705/5
2011/0161130 A1* 6/2011 Whalin et al. ............. 705/7.18

OTHER PUBLICATIONS

Schafer et al., "Meta-recommendation System: User-controlled Integration of Diverse Reccomendations", 2002, pp. 43-51.
Eliashberg et al., Demand-driven scheduling of movies in a multiplex, Intern, J. of Research in Marketing (2009) pp. 75-88.
"The Hollywood Reporter", Southeast Special Issue, Oct. 30-Nov. 5, 2001, 2 pgs.
"The Hollywood Reporter", Weekly International Edition, a VNU publication, Dec. 24-30, 2002, 1 pg.
Greg Lohr, "Unhappy endings have movie chains turning to ads", Washington Business Journal, vol. 20, No. 9, 1 pg.
"Promotions In Brief", Entertainment Marketing Letter, Dec. 15, 2002, vol. 15, No. 24, 1 pg.
Adrian Toader, DTDS: "The Silver Bullet", cinema digitalcinema™, Oct. 2002, 1 pg.
Annalee Ellingson, "New Technology; Alternative Content, What's the Alternative?", Boxoffice, Oct. 2002, 2 pgs.
Carla Hay, "Artists Go To The Movies", Billboard, Jul. 13, 2002, 4 pgs.
http://proquest.umi.com/pqdweb?index=59&3&srchmode=1&vinst=PROD&fmt=3&, "AOL's Digital City and Inshop.com announce comprehensive Content Agreement", Business/Technology Editors, Business Wire, New York: Dec. 1, 1999 2 pgs.
http://web.archive.org/web/2001018195019/http://www.spiritualresponse.com/RDclasses . . . , Classes with Robert Detzler, May 20, 2008, 2 pgs.
http://web.archive.org/web/20001201184700/www.rockyhorror.com/midnt.html, "Rocky Horror" Currently Playing Midnight Shows (As of Jan. 1998), May 19, 2008, 16 pgs.
http://web.archive.org/web/1999011701532/http://www.netflix.com/ Easy DVD Movie Rentals at Netflix.com Rent Digital Video Discs., Sep. 17, 2007, 3 pgs.
http://proqust.uml.com/pqdweb?index=18&sid=3&srchmode=1&vinst=PROD&fmt=3&s . . . Let the wide screen transport you; [Final Edition], ProQuest, Aug. 21, 2007, 2 pgs.
http://web.ebscohost.com/ehost/delivery?vid=28&hid=103&sid=962d51e9-d29d-4c9d8d0 . . . Shortage of ticket sales pulls plug on bethel '94., EBSCOhost, Sep. 17, 2007, 1 pg.
http://web.ebscohost.com/ehost/delivery?vid=9&hid=103&sid=962d51e9-d29d-4c9d-8d0b . . . , Louisiana State Univ. Looking at Funding Stadium with PSLS, EBSCOhost, Sep. 17, 2007, 3 pgs.
http://web.archive.org/web/2001109025500/www.ticketmaster.com/h/faqs.html, Welcom to Ticketmaster.com!, Sep. 17, 2007, 8 pgs.

* cited by examiner

METHOD AND APPARATUS FOR DEMAND ASSIGNMENT OF CONTENT DISPLAY OPPORTUNITIES

CROSS REFERENCE TO RELATED APPLICATION

This application claims the benefit of the filing date pursuant to the provisions of 35 U.S.C. §119(e), of U.S. Provisional Patent Application Ser. No. 61/401,208, filed Aug. 9, 2010, entitled "METHOD FOR DYNAMIC ASSIGNMENT AND DISTRIBUTION OF THEATER/SCREEN CONTENT DRIVEN BY SPECIFIC CONSUMER CHOICE AND DEMAND". The disclosure of the foregoing application is incorporated herein by reference.

BACKGROUND OF THE INVENTION

Theatre Operators/Movie Exhibitors (Exhibitors) have historically been totally dependent on the content they receive from the Movie Studios—good product, great year for the Exhibitors, bad product and Exhibitors suffer. With little ability to influence the quality of Studio product, the Exhibitors have been constantly searching for ways to consistently fill their seats (cinema resources), a large portion of which experience low utilization, especially during the work week. Alternative Programming events (non-movie content) have had limited success, as they are handicapped by programming inconsistency, fragmented audiences and challenges in advertising and communicating the pre-selected events. As a consequence the Exhibitors continue to suffer from under-utilized screen capacity, forever dependent on movie hits that can run long enough for them to get a profitable share of receipts. On top of it all, the movie product cycle is being more aggressively managed by the Studios each year, with ever shorter Theatre exclusive engagements and alternative content distribution methods constantly experimented with the Studios, all of which contribute to increased business stress for the Exhibitors.

While movie going is still a strong social and cultural activity for most consumers (users), the evolution of in-home Entertainment alternatives continues to compete for both their time and discretionary dollars. TV content, Cable HD distribution, and the interactivity of the Internet are becoming bigger competitive factors for the Exhibitors. Culturally and technologically, we are also witnessing more fragmentation of the market into 'similar interests groups', as the boom in Social Networking is affecting the consumer market; this is especially true in the case of the desirable, younger demographics. Trying to address some of these special content needs is quite challenging for the Exhibitors, as the inefficiencies of pre-selected, pre-scheduled events and content creates unpredictable attendance and operating results.

The Exhibitor's biggest asset is the atmosphere of the experience in the theatre, made up by superior visual, sound and setting components, where a user is part of a large group sharing the event.

SUMMARY OF THE INVENTION

Giving consumers the ability to manage their own programming (the "what, where and when" variables) will enhance their willingness to attend performances they have, in effect, scheduled themselves (on demand).

The invention allows users (i.e., the consuming public) to partake in scheduling particular content for display at a particular venue (i.e. a theatre) and time. By monitoring the number of users having selected a particular content for display at a particular venue (i.e. a theatre) and time the exhibitor, or an agent (an on demand servicer), can refrain from actually scheduling a display until the demand for the display makes financial sense for the exhibitor. In this way the exhibitor reaps the advantage of displaying particular content at a particular venue and time only after a sufficient number of users have manifested an interest in attending the display, or actually have pre-paid for the display, so as to insure that the display is, in fact, a benefit to the exhibitor. While the content to be displayed can include first run or older movies, there is no reason why the content for display need be restricted to movie content. Any other content which is capable of display in a modern theatre may form the content component for display. This includes pre-recorded or live events such as concerts, operas, speeches, lectures, sporting contests and the like.

Embodiments of the invention include communication devices for the users to allow them to connect or otherwise interact with an on demand servicer. The users (those actually making selections as well as other members of the public who have not made selections) may also connect with, one or more social network sites (Facebook, MySpace, Google+, LinkedIn or the like) and/or one or more specialty sites and/or one or more exhibitor sites. The user communication devices may be telephonic or message based. The users may be allowed to browse (either visually using a message based device or audibly using a telephonic based device) among listings of content for display, theatres in which the display may occur and related temporal parameters (i.e., time slots in which the display may be available). A user may select:

a) a content item for display,
b) a venue for the display (i.e., a particular theatre), and
c) related temporal information, i.e., a time slot for the display.

Identification of a content item for display may take the form of a title or number or a combination of the foregoing. There are many ways to identify a venue or theatre. A venue or theatre may be identified by name or number, by a street address, town or city, zip code or combinations of the foregoing. In some cases venue might include identification of a particular screen for multi-screen theatres. One example of identification of a time slot or temporal information might be identification of a month and day selected for the display. Another identification might include a year in addition to the month and day.

In one embodiment the selections made by selecting users are communicated to an on demand servicer where they are used to form a content selection database. The on demand servicer monitors the content selection database to identify the existence of selections (that is content, venue and temporal parameter) which are duplicated. When the number of duplicate selections in the content selection database exceeds a predetermined threshold the on demand servicer can initiate a record in a scheduled database. By setting the threshold equal to the minimum number of viewers the exhibitor requires for a potentially profitable event, each record in the scheduled database represents identification of a profitable event. The on demand servicer may notify the exhibitor to schedule the event and may also notify selecting users of the scheduling of the event. In addition, information about the scheduled event may be distributed to interest others in also attending. Those others may be friends of the selecting user(s) who initially made the selection. Those friends may be contacted through social networks (i.e., Twitter or Facebook or the like) via associations with the selecting users. Still others may be solicited via social networks or specialty networks as individuals who have manifested an interest in content of the same type and/or located in the vicinity of the selected theatre. Those others may be contacted via exhibitor Main and Reward sites like MovieWatcher.com, etc.

In some embodiments the content selection database and the scheduled database may be found in a single database. For example, scheduling information may be added to a record of the content selection database to indicate that the recorded selections (content, venue and related temporal data) have been selected by users in excess of the predetermined threshold number of users.

In another embodiment, where users access an on demand servicer node using a message or telephone based interface, a user chooses a particular content for display at a particular theatre and time slot. The user's choice is recorded in a database along with the choices of other users. The contents of the database are tabulated by content, theatre and time slot. When the number of users having selected a particular content, theatre and time slot is in excess of a relevant, theatre related threshold, scheduling data is added to the database indicating that the threshold has been exceeded for the particular selection. Related data is then distributed to the selecting users, the related exhibitor and may also be distributed to social networking and specialty websites to further publicize the intended display.

Optionally the on demand servicer (or the exhibitor) may interact with the provider of the selected content so the selected content can be supplied to the selected theatre or venue for display as scheduled.

In accordance with one aspect the invention comprises a system useful in increasing efficient use of cinema resources, said system including:
 a) a first database of content available for display;
 b) a second database storing sets of user data, each set of user data including identification of a theatre, a particular content item and related temporal data;
 c) a third database storing data sets, each data set identifying:
  1) a particular content item;
  2) a theatre; and
  3) related temporal data
 only for instances wherein plural users have identified identical sets of user data.

In accordance with another aspect the invention comprises a system useful in increasing efficient use of cinema resources, said system including:
 a) a database storing sets of user data, each set of user data including identification of a theatre, a particular content item and related temporal data; said database further including scheduling information indicating that at least one said set of user data including the theatre identification, particular content and related temporal data of said set of user data have been selected by a number of users greater than a predetermined threshold, and
 b) a processor responsive to user input for writing to said database In accordance with still another aspect the invention comprises a method for increasing efficient use of cinema resources, said method comprising:
 a) providing a database of content items available for display
 b) receiving and storing sets of user data to create a content selection database, each set of user data including identification of a theatre, a particular content item and related temporal data; and
 c) creating a scheduled database storing data sets, each data set in said scheduled database identifying:
  1) a particular content item;
  2) a theatre; and
  3) related temporal data, the data sets in said scheduled data based limited to data sets wherein a number of users greater than a predetermined threshold have identified identical sets of user data.

In accordance with still another aspect the invention comprises a computer readable medium storing a sequence of instructions which, upon execution, performs a method for increasing efficient use of cinema resources, said method comprising:
 a) providing a database of content items available for display
 b) receiving and storing sets of user data to create a content selection database, each set of user data including identification of a theatre, a particular content item and related temporal data; and
 c) creating a scheduled database storing data sets, each data set in said scheduled database identifying:
  1) a particular content item;
  2) a theatre; and
  3) related temporal data, the data sets in said scheduled data based limited to data sets wherein a number of users greater than a predetermined threshold have identified identical sets of user data.

DESCRIPTION OF PREFERRED EMBODIMENTS

Figure 1:
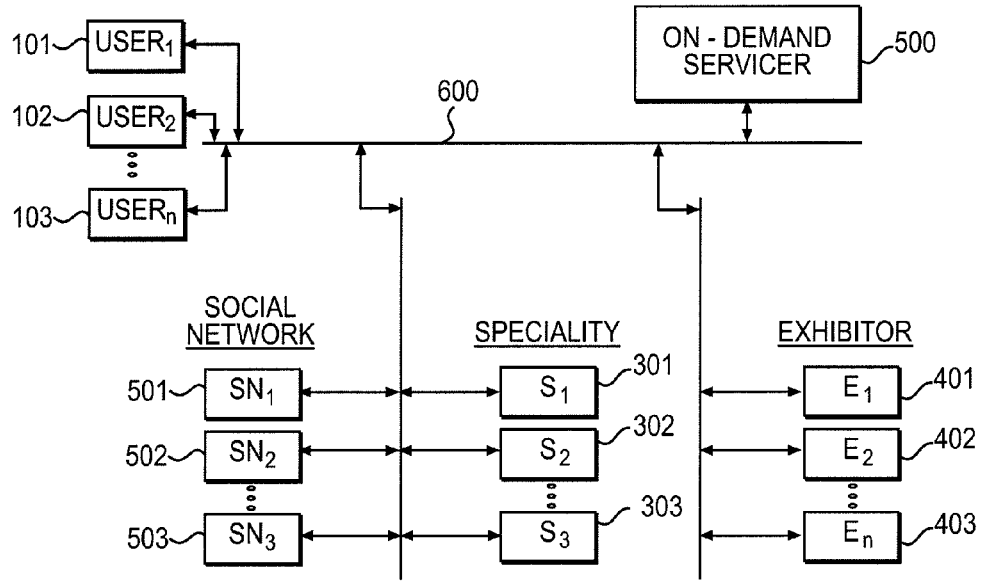
FIG. 1 is a schematic illustrating a system for improving efficient use of cinema resources by on demand scheduling.

FIG. 1 is a schematic illustrating a system for improving efficient use of cinema resources. FIG. 1 shows a plurality of users, $USER_1$ through $USER_n$. Each USER can communicate selections and otherwise interact via associated devices 101-103. In one embodiment the devices 101-103 represent computing systems which are available to users. FIG. 1 also shows plurality of social networking websites $SN_1$ through $SN_3$. Each of the social networking systems includes a different computing system illustrated as computing systems 501-503. FIG. 1 also shows plurality specialty websites $S_1$-$S_3$ each including a computing system illustrated as computing systems 301-303. The specialty websites are dedicated to public interaction concerning content which may be selected by users. One specialty website may be dedicated to Western movies, others dedicated to different sports, etc. Finally, FIG. 1 also shows a plurality of exhibitors websites $E_1$-$E_n$ with computing systems 401-403. The exhibitor websites $E_1$-$E_n$ provide a communications path to/from the exhibitor. In the embodiment illustrated in FIG. 1, users may employ message based communication devices (computer systems, whether desk-top, laptop, handheld or otherwise) to send and receive information and make selections. In other embodiments the users may use telephone based devices to send and receive (audible) information for selection purposes.

The exhibitors associated with computing systems 401-403 operate one or more cinemas. Some exhibitors have cinemas which may be restricted geographically to one or a limited number of neighborhoods, towns, cities or zip codes while other exhibitors have cinemas which are more widely distributed.

FIG. 1 also shows on-demand servicer 500 in accordance with a first embodiment of the invention. The functions and apparatus of the on-demand servicer 500 will be described in detail. As is the case with some of the other devices shown in FIG. 1, the on-demand servicer 500 also has a dedicated website available to users for performing the functions set forth later in this description. Each of the devices shown in FIG. 1 is interconnected by a network 600. The network 600 may be wired, wireless or a combination of wired and wireless. In one embodiment the network 600 may comprise or include the Internet. In other embodiments the network 600 may be a local area network or a combination of local area networks interconnected by a wide area network. In addition the network 600 may include the Public Switched Telephone Network (PSTN) allowing users to use telephone based devices for making selections. As will be apparent to those skilled in the art a user, such as $USER_1$, using the network 600 and computing system 101, can access the on-demand servicer website as well as any of the social networking websites, any of the specialty websites or any of the available exhibitor websites.

In general the computing systems referred to will include processor(s), memory, I/O devices and related interfaces. This application does not describe the details of computing systems which are identified as computing systems 101-103, 301-303, 401-403, 501-503 and the on-demand servicer 500. Those skilled in the art are well acquainted with computing systems capable of performing the required functions. While the user systems 101-103 could be hard wired to the network 600, in some embodiments one or more of the user systems 101-103 could be connected to the network 600 via wireless access. The same is true of other computing systems of FIG. 1. The user systems 101-103 which are message based can be selected from a wide variety of devices including PCs or Apple based desk top, portable or laptop. Message based systems also include Smart Phones and Tablets (Apple, Android, RIM or WebOS software) operating with specialized apps or Web interfaces. As noted the user systems may also be telephone based so long as the cooperating equipment (on demand servicer) provided access via an Interactive Voice Response Platform allowing conventional wired or wireless telephones to respond to interactive, menu based voice prompts or voice recognition interfaces.

One of the functions of the on-demand servicer 500 is making selection information available the user systems 101-103. The selection information includes available program content. As has been noted that available program content maybe pre-recorded and/or live. The content is identified in a meaningful way to the user such as by movie title, sporting event type and participants etc. The content made available to the users can be presented in many different ways. For message type systems the content can be presented alphabetically by title, by genre, by relation to past selections of the user, etc.

On-demand servicer 500 will also makes available to the user systems 101-103 theatre and time slot information. Theatre information identifies the cinema in which the program content is to be displayed in the future. The theatre may be identified in any recognizable way, by number, name, street address, city, town, city/town and state, zip code etc. For each theatre or cinema which is identified as a potential display location, one more time slots is also identified. The time slot represents the period of time, in the future, during which the potential program material would be displayed at the theatre. While there are many ways to identify a time slot, one way to identify a time slot is by month and day (February 3). Another way is by month day and year (Feb. 3, 2011). And still another way to identify a time slot is by month day and time of day (February 3, 12:15 pm). Telephone based user devices interact with a on demand servicer voice response platform to provide the user with voice prompts describing the available content, venue and temporal choices. Voice recognition equipment operated by the on demand servicer is used to create digital data corresponding to the user's audible responses to the available content, venue and temporal choices. That digital data is then stored in a database in the same way that a user's message based choices lead to digital data which maybe stored in the same database.

A user intending to make use of the services provided by the on-demand servicer 500 will arrange his computing system 101 to access the on-demand servicer website. One of the features of the on-demand servicer website will allow the user to select a particular program content and a particular theatre/timeslot.

Figure 2A:
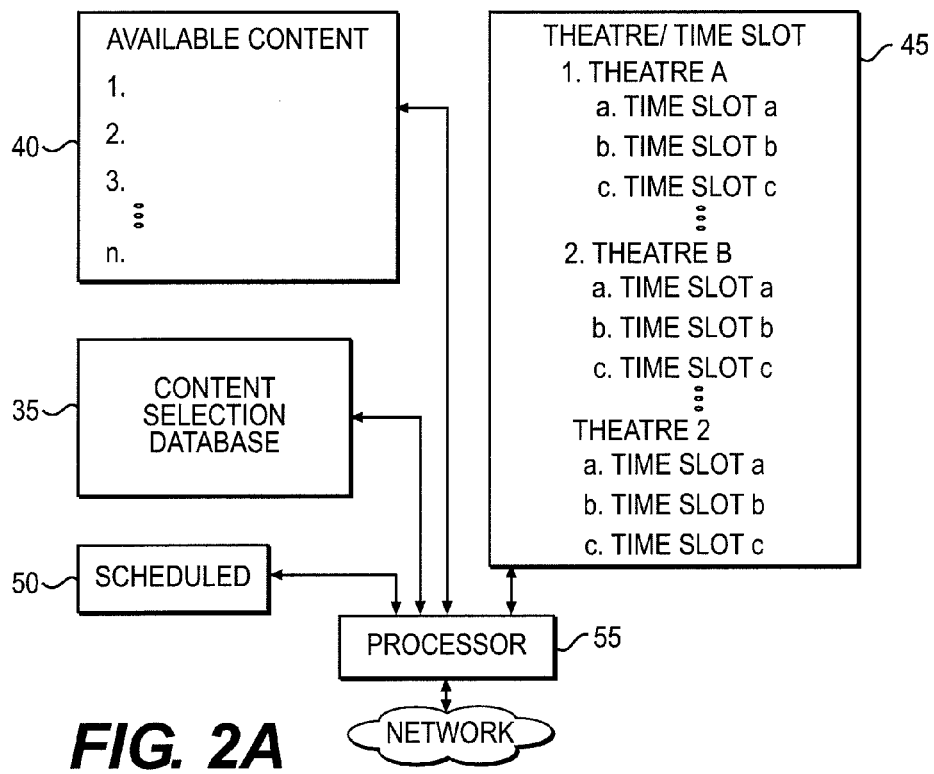
FIG. 2A illustrates components of the On Demand Servicer 500 of FIG. 1 in accordance with a first embodiment of the invention.
Figure 2B:
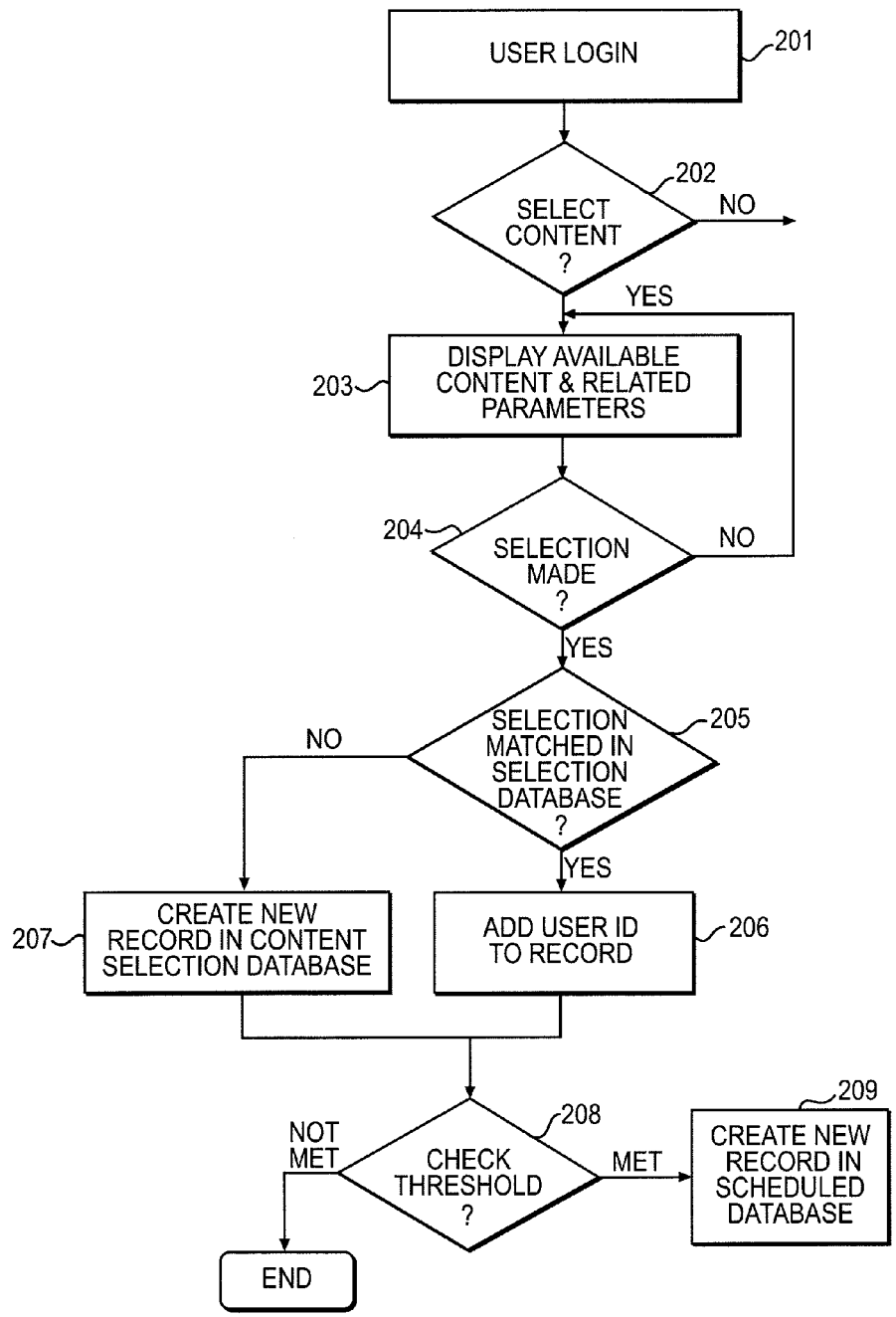
FIG. 2B is a flow diagram of a user process executed by a processor of the ON Demand Servicer 500 of FIG. 1.

FIG. 2A illustrates some of the components of the on-demand servicer 500. As shown in FIG. 2A the on-demand servicer 500, in accordance with one embodiment, includes four databases, a content selection database 35, a theatre/timeslot database 45, an available content database 40 and a scheduled database 50. Each of the databases are coupled to processor 55 which in turn is connected to the network 600. Before describing how the data in the databases is manipulated reference is made to FIG. 2B to illustrate one of the routines which is performed by the processor 55 on access by user. As shown in FIG. 2B a user may login (201). In some embodiments of the invention the user will have registered prior to execution of the procedure of FIG. 2B. In that case the user login will merely require the user to input some combination of data to identify the user and related registration records. In other embodiments the user need not be registered before accessing servicer 500 and initiating the procedure of FIG. 2B. In that event the user login (201) may require the input of additional information from the user for identification purposes such as name, address, credit information etc.

Regardless of the particular requirements of the login procedure (201), once the login procedure has been completed the user is presented with a choice 202, whether or not a content selection process will be performed. In other words, does user intend to make some content selection? If not, processing follows the "no" path from function 202 to perform other procedures (not illustrated). In the event the user indicates that content selection is desired then processing moves to step 203 where available content and related parameters are made accessible or displayed to the user. The available content and related parameters are accessed from the databases 40 and 45. For example, the user may be presented with potential available content selections from the database 40. There are many way in which available content may be presented to the user. Prior content choices of the user may be consulted to identify presently available content which is most nearly like the user's prior choices. Alternatively, choices can be presented to the user randomly, alphabetically or by genre; user selected genre, alphabetically presented or randomly presented genre choices. There are still other ways of selecting content for presentation to the user which will occur to those skilled in the art. All of these techniques fall within the scope of the invention. When a user makes a selection from the available content database 40, then the user is presented with the choice of theatre and timeslot. Again the theatres presented to the user for selection may be driven by the knowledge of the user's address or the choices may be presented randomly, or in some other fashion. Typically, for each theatre choice, there will be a choice of plural time slots. On the other hand in some cases there will be only a single timeslot for a given theatre, in other cases there will be only a single theatre for a given content. After the user has made selections for all required parameters so that there is a fixed choice for all three items (content, theatre, timeslot) step 204 will recognize that the required selections have been made. As will be described the user selection will be recorded in the content selection database 35. Before recording, however, function 205 compares the current user selections with selections already recorded in the content selection database 35 to determine if the current user selections are identically matched by a selection already in the content selection database 35. Either the current selection is matched or it is not. In the case the current selection is not matched then the "NO" path is followed and the step 207 is executed to create a new record in the content selection database 35 reflecting the user's current selection. Alternatively, if the current selection is matched in the content selection database 35 then the YES path is followed and information concerning the current user selection will be added to the database 35. In one embodiment the user's identification is added to the record in the database 35 which corresponds to the user's current selections.

Figure 2C:
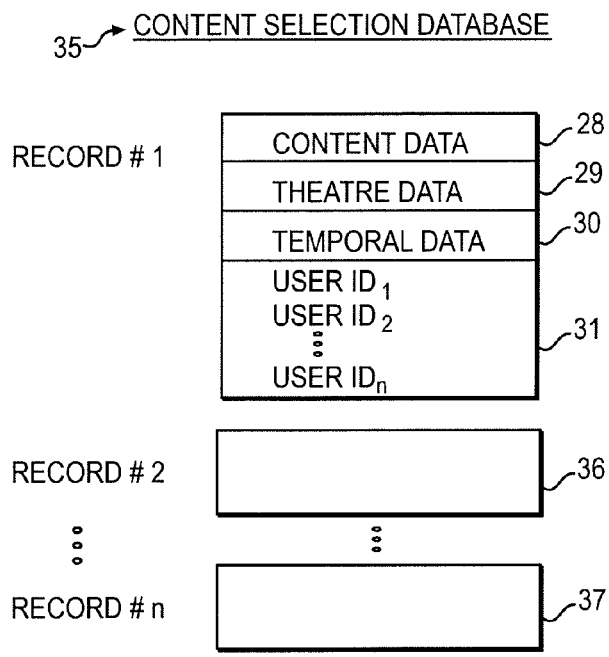
FIGS. 2C and 2D illustrate the contents of a Content Selection Database and a Scheduled Database, respectively, each a component of the On Demand Servicer 500 of FIG. 1.

FIG. 2C is an example of the organization of the contents of the content selection database 35 in accordance with one embodiment. FIG. 2C shows the database 35 comprises a series of records, record number 1, record number 2 and so on to record n. As shown in FIG. 2C each record in the content selection database includes a number of components. One component is content data 28 which represents the user's selection from available content database 40. Another component is theatre data 29, selected from the theatre/timeslot database 45. Another component is temporal data 30, selected from timeslot information of the theatre/timeslot database 45. In addition, each record includes component 31 recording at least one user ID (identifying a user having made the related selection). As will be described, when an additional, identical selection is made by a new user (identified in step 205), the new user's ID is added to the record. Thus a record may include the ID of many users, i.e., precisely those users who in the past have made the related selections. In another embodiment of the content selection database, each record will includes four components, the content data 28 selected by a user, the theatre data 29 selected by that user, the temporal data 30 selected by that user, and that user's ID. In this embodiment there will be a different record made for each user selection. Still other variations in recording this data will be apparent to those skilled in the art.

Returning to the description of FIG. 2B, after either step 206 or step 207 is executed the next step to be performed is step 208 where a threshold is checked.

At this stage in the processing, the content selection database 35 will enable the processor to identify the number of users having made the same selection. The exhibitor associated with a theatre may identify a threshold as that number of customers considered a minimum to justify scheduling content for display at a particular theatre and particular timeslot. This threshold may be constant for all exhibitors, it may vary by exhibitor, it may vary with the theatre and/or theatre and timeslot. In any event at step 208 a comparison is made between that threshold and the number of users having made the related selection so as to determine if the threshold is or is not met. If the threshold is not met, then this portion of the procedure has been completed.

On the other hand, if the threshold is met then a sufficient number of users have made the selection to justify the scheduling the presentation of the particular content in the particular theatre in the particular selected timeslot. Therefore function 209 is performed to create a new record in the scheduled database 50 (see FIG. 2A).

Figure 2D:
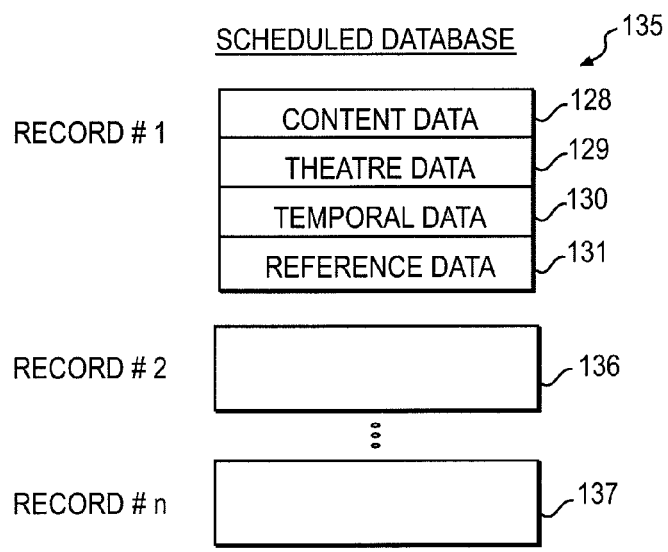

FIG. 2D is an example of one form in which the data recorded in the scheduled database 50 can be stored. As shown in FIG. 2D, one record, record number 1 includes content data 128, theatre data 129, temporal data 130 and reference data 131. The reference data component 131 is a way of capturing the identity of the users having made the data selection found in records 128-130. The reference data 131 may be simply a list of user IDs. Alternatively, it could be a reference to a record (in the content selection database 35 or elsewhere) in which is stored the user IDs having made that selection. Regardless of how this data storage is implemented, reference data 131 enables the processor 55 to identify the particular users having made the associated selections and the number of those users.

Figure 2E:
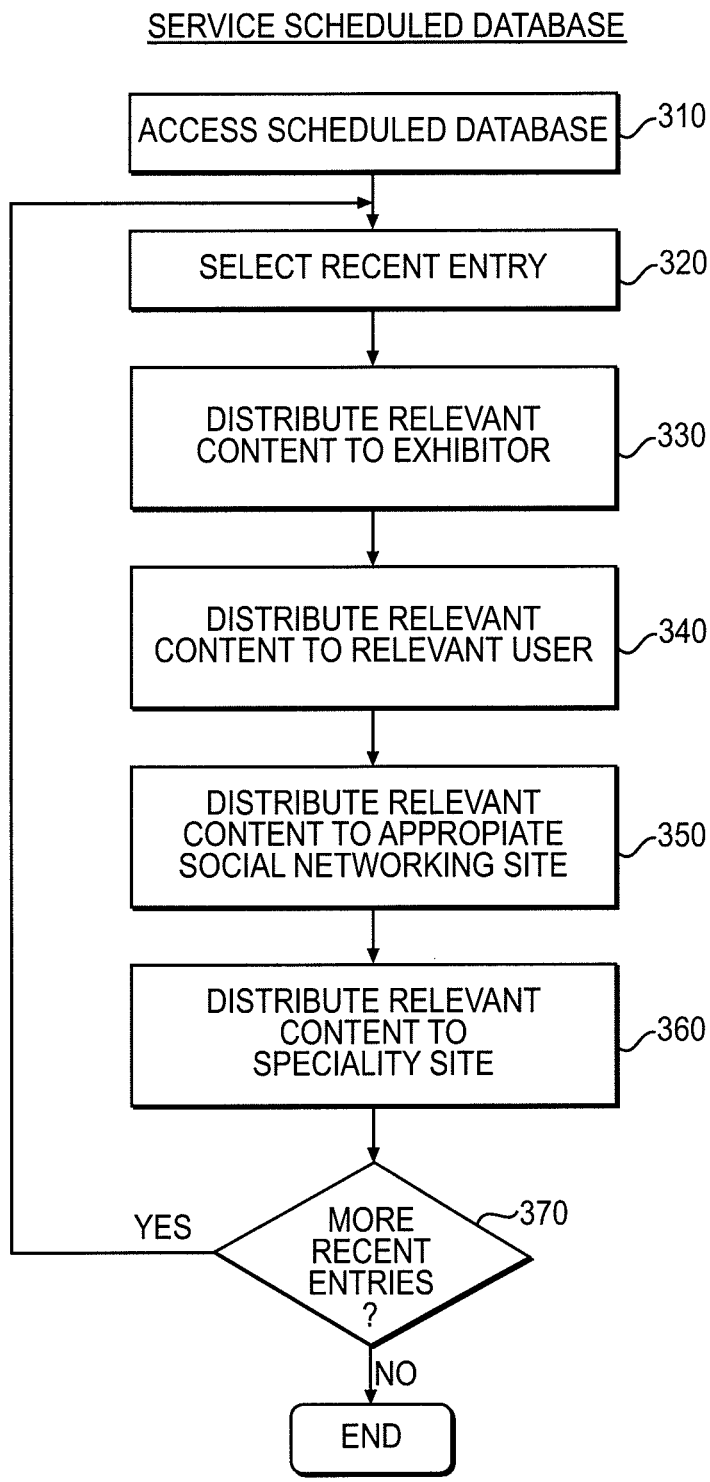
FIG. 2E illustrates a flow diagram of another process executed by a processor of the On Demand Servicer 500 of FIG. 1.

Another procedure performed by the processor 55 is illustrated in FIG. 2E. As shown, the procedure of FIG. 2E operates on the contents of the scheduled database 50. The first function, 310 accesses the scheduled database 50. Step 320 selects a recent entry, for example an entry in scheduled database 50 that has not yet been processed by the procedure of FIG. 2E. Step 330 distributes information from this record to the related exhibitor site. Referring again to FIG. 2D, the scheduled database 50 includes records which identify a particular content (128), theatre (129) and related temporal data (130). Once the threshold number of users has been identified to justify scheduling a particular content, step 330 transmits the pertinent content (at least components 128-130) to the exhibitor operating the particular theatre. Processor 55 has access to theatre/exhibitor site address information to allow proper addressing of this information for transmission to the exhibitor. Receipt of this information enables the exhibitor to integrate the information received from the scheduled database 50 into operating schedule of a particular theatre. The information from the scheduled database 50 may be used to actually schedule the presentation or the scheduling may be conditional on receipt of payment by the users who actually made the selections. In the latter case the exhibitor may also receive the identification of the users associated with the selections reflected in components 128-130.

In some embodiments the exhibitor will be concerned with payment functions. In that event the exhibitor requires the identity of the users who had requested the presentation of the particular selected content. By transmitting that information to the exhibitor, the exhibitor is enabled to request payment from the users. Alternatively, payment functions can be handled by the on-demand servicer 500 or by a still different entity. In any event, the identity of the selecting users, which is available from the reference data 131, will be important in completing the payment function.

After distributing the content to the appropriate exhibitor (330) the next step (340) distributes relevant content to the related user. In this step the users who actually made the selections which led to the entry in the scheduled database 50 are informed that their selection will be presented at the selected theatre selection at the time slot of their selection. This may signal to those users the need or obligation to make payment, etc.

The next step in the procedure of FIG. 2E is to distribute relevant content to appropriate social networking sites (350). As those skilled in the art are aware, social networking sites can identify a group of interested individuals from the identification of a particular user. Accordingly, step 350 distributes the relevant content, e.g. the content data 128, theatre data 129, temporal data 130 and related user identification to particular social networking sites. For example, the user login or registration procedure may identify a social networking site related to the user. For each user identified in the record being processed, a message is transmitted to any related social networking site(s). The message identifies both the user and the particulars of the scheduled presentation. In this way, individuals who are associated with the user at that social networking site, can be informed, by the social networking site, of the particular presentation which is scheduled and the fact that the driving impetus for the scheduling is the particular user. Presumably some portion of the individuals associated with the user may be interested in also attending the presentation. Distributing this information increases the probability that those viewing the scheduled presentation will include some of the individuals whom the social networking site has associated with the selecting user of the content.

Step 360 is executed to distribute the relevant content (in this case the particular content, the particular theatre and the particular temporal data) to a particular specialty site. For example, a specialty site which specializes in "westerns" can be informed of the scheduled presentation of a western film. Information presented by the specialty site enables individuals accessing the specialty site (presumably interested in presentation of western content) to be informed of the scheduled display of the western allowing those individuals to attend the presentation as well.

Finally, step 370 determines if there are more recent entries for processing and, if so. processing returns to step 320 to begin the loop again with respect to another record from the scheduled database 50.

Figure 3A:
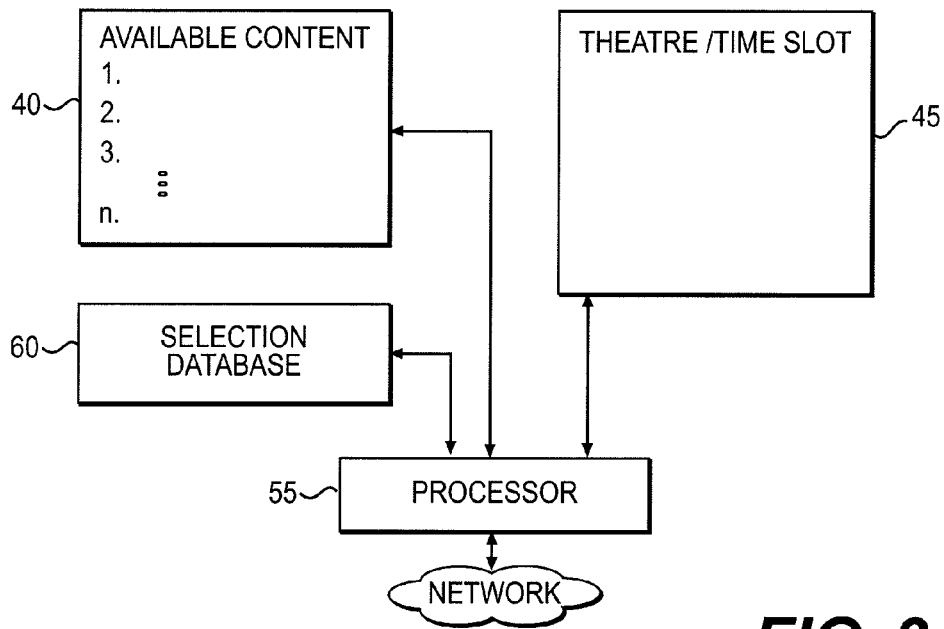
FIG. 3A illustrates components of the On Demand Servicer 505 according to another embodiment.
Figure 3B:
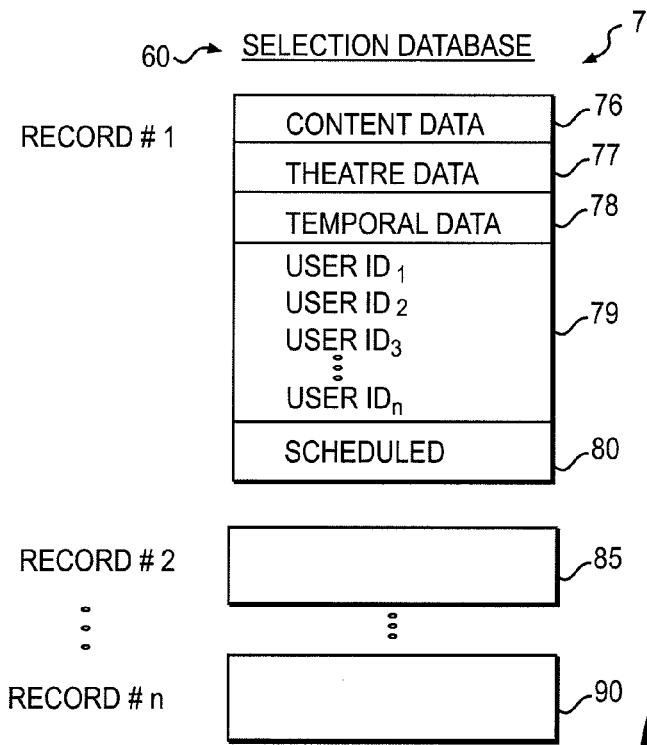
FIG. 3B illustrates the contents of a Selection Database in accordance with another embodiment.

Another embodiment is illustrated in FIGS. 1, 3A and 3B. In this embodiment the on demand servicer 500 of FIG. 2A is replaced by the on demand servicer 505 shown in FIG. 3A. As seen in FIG. 3A, the on demand servicer 505 differs from the on demand servicer 500 (of FIG. 2A) in that the content selection database 35 and scheduled database 50 of FIG. 2A are replaced by the single selection database 60. FIG. 3B is an illustration of one format in which the data may be stored in selection database 60. A typical record of selection database 60 includes fields 76-80. Fields 76-79 may be the same as fields 28-31 of content selection database 35 storing, respectively, content data, theatre data, temporal data and user ID. Field 80 is a scheduled field. Scheduled field 80 stores distinctive information to indicate whether a number of users in excess of the related predetermined threshold have made the associated selections. The first time a selection is made with given content, venue and temporal data a corresponding record may be written to the selection database 60. On each subsequent occasion the same selection is made by a user, that user's ID is added to the record (either directly or indirectly) and the number of users identified in the record is compared to the predetermined threshold. When the number of users exceeds the threshold the distinctive information (which need only be a schedule flag indicating that the conditions required for scheduling have been met) is written to field 80. Thereafter information may be distributed to users, exhibitors, social and specialty networks as described in connection with FIG. 2E.

Procedures like those found in FIGS. 2B and 2E are also associated with the embodiment of FIGS. 3A/B. The procedure for writing to the selection database 60 is almost identical to the procedure shown in FIG. 2A. There are three changes. In steps 205 and 207 the database referred to is the selection database 60 and not the content selection database 35. In step 209 rather than creating a new record in a scheduled database 50, the scheduled field 80 of the selection database 60 is written with distinctive information indicating that the number of users having made the selection exceeds the predetermined threshold and scheduling the display is justified. The procedure for distributing information is also almost identical to the procedure of FIG. 2E. The changes from the procedure of FIG. 2E are now described. The access of step 310 is to the selection database 60 and not the scheduled database 50. Step 320 addresses only recent entries meeting two conditions: a) entries where field 80 includes the distinctive information representing selection by more users than the predetermined threshold and b) entries from which information has not yet been distributed.

In some embodiments the on demand servicer will not actually distribute selection information to exhibitors, social networking sites or specialty sites unless the user selection is accompanied by payment or the promise of payment, This may be implemented by requiring the user to add credit card information (or make other payment arrangements such as PayPal, Google or other Bank related procedures) to the selection information. The users may be informed that no charge will be processed unless the user's selection is actually scheduled and in the event the user's selection is scheduled but later cancelled then a refund will be provided to the user. The credit card or other payment information may be collected in either step 203 or 209 of FIG. 2B.

In other embodiments the exhibitor associated with the selected theatre receives user ID information and carries out payment related procedures.

In still another embodiment payment is not required until the user attends the actual display of the content. In the following claims the term "user" or "users" shall mean a member or members of the consuming public as consumers of content exhibition in theatres, cinemas or other viewing locations simultaneously serving multiple users or viewers.

While several specific embodiments of the invention have been described it will be understood that many changes can be made to the specific features described herein; the scope of the invention is to be determined from the claims appended hereto.

The invention claimed is:

1. A system useful in increasing efficient use of cinema resources, said system including:
 a) a first database of content items available for display;
 b) a second database storing data sets, each data set identifying:
  1) a particular content item;
  2) a theatre; and
  3) related temporal data, said related temporal data representing a time slot for display of the particular content item at the theatre, and
 c) a processor responsive to user selection of a data set comprising a particular content item, a theatre and related temporal data for writing said data set to said second database only for instances wherein plural users have identified identical data sets;

wherein said processor includes:
- c1) means responsive to user selection of a data set representing a particular content item, a particular theatre and related temporal data for recording said data set in a third database and associating identification of said user with said recorded data;
- c2) means for determining that a number of users have selected identical identification of a theatre, a particular content item and related temporal data, and
- c3) means for comparing the number of said users having selected identical identification of a theatre, a particular content item and related temporal data with a predetermined threshold wherein said processor writes said data set to said second database only where a number of users greater then a predetermined threshold have created identical data sets.

2. The system of claim 1 wherein said processor associates said user identification with said stored identification of a theatre, a particular content item and related temporal data in said second database.

3. The system of claim 1 which further includes means for distributing data from selected data sets of said second database.

4. The system of claim 3 which further includes means for distributing data from a particular data set of said second database to a user selected from users associated with said particular data set.

5. The system of claim 3 which further includes means for distributing data from a particular data set of said second database to at least one exhibitor related to a theatre identified in said particular data set.

6. The system of claim 3 which further includes means for distributing data from a particular data set of said second database to at least one social networking site related to a user associated with said particular data set.

7. The system of claim 2 wherein said temporal data includes identification of a particular month and day.

8. The system of claim 4 wherein said temporal data includes identification of a particular month and day and wherein the data which is distributed includes identification of a particular content item, theatre, month and day.

9. The system of claim 5 wherein said temporal data includes identification of a particular month and day and wherein the data which is distributed includes identification of a particular content item, theatre, month and day.

10. The system of claim 6 wherein said temporal data includes identification of a particular month and day and wherein the data which is distributed includes identification of a particular content item, theatre, month and day.

11. A system useful in increasing efficient use of cinema resources through on demand scheduling, said system including:
- a) a database storing sets of user selected data, each set of user selected data including identification of a theatre, a particular content item and related temporal data, said related temporal data representing a time slot for display of the particular content item at the theatre; said database further including scheduling information indicating that at least one said set of user selected data including the theatre identification, particular content and related temporal data of said set of user data have been selected by a number of users greater than a predetermined threshold, and
- b) a processor responsive to user input for writing to said database;

wherein said processor includes:
- c) means responsive to user selected data representing a particular content item, a particular theatre and related temporal data for recording said data in said database and associating identification of said user with said recorded data;
- d) means for determining that a number of users have selected identical identification of a theatre, a particular content item and related temporal data,
- e) means for comparing the number of users having selected identical identification of a theatre, a particular content item and related temporal data with a predetermined threshold, and
- f) means for storing said scheduling information in said database when said number exceeds said threshold.

12. The system of claim 11 wherein said processor associates user identifications, associated with said user selected data, with said stored data.

13. The system of claim 11 wherein said temporal data includes identification of a particular month and day.

14. The system of claim 11 which further includes means for distributing selected data from said database.

15. The system of claim 14 wherein said processor associates user identifications, associated with said user selected data, with said stored data and wherein selected data is distributed to a user selected from users identified by said database as related to said selected data.

16. The system of claim 14 which includes means for distributing selected data from said database to at least one exhibitor related to a theatre identified in said selected data.

17. The system of claim 14 which includes means for distributing data from a selected data set of said database to at least one social networking site associated with a user related to said data.

18. A method implemented in a computer system for increasing efficient use of cinema resources through on demand scheduling, said method comprising:
- a) providing information identifying content items available for display from said computer system;
- b) receiving and storing in a database of said computer system sets of user selected data, each set of user selected data including identification of a theatre, a particular content item and related temporal data, said related temporal data representing a time slot for display of the particular content item at the theatre; and
- c) storing scheduling information in said computer system related to:
  1) a particular content item;
  2) a theatre; and
  3) related temporal data, indicating that a number of users greater than a predetermined threshold have identified identical sets of user data;
  which further includes:
- d) recording in said database user selected data representing a particular content item, a particular theatre and related temporal data and associating identification of said user along with said recorded user selected data;
- e) determining a number of users having selected identical identification of a theatre, a particular content item and related temporal data,
- f) determining whether to store scheduling information by comparing the number of said users having selected identical identification of a theatre, a particular content item and related temporal data with a predetermined threshold, and
- g) storing said scheduling information when said number exceeds said threshold.

19. The method of claim 18 wherein said temporal data includes identification of a particular month and day.

20. The method of claim 18 which further includes distributing selected data from said scheduling information.

21. The method of claim 20 wherein said selected data is distributed to a user selected from users associated with said selected data.

22. The method of claim 20 wherein said selected data is distributed to at least one exhibitor related to a theatre identified in said selected data.

23. The method of claim 20 wherein said selected data is distributed to at least one social networking site related to a user associated with said selected data.

24. A non-transitory computer readable medium storing a sequence of instructions which, upon execution, performs a method for increasing efficient use of cinema resources through on demand scheduling, said method comprising:
   a) providing information identifying content items available for display
   b) receiving and storing in a database sets of user data, each set of user data including identification of a theatre, a particular content item and related temporal data; and
   c) storing scheduling information related to:
      1) a particular content item;
      2) a theatre; and
      3) related temporal data, said related temporal data representing a time slot for display of the particular content item at the theatre, indicating that a number of users greater than a predetermined threshold have identified identical sets of user data;
   d) recording in said database user data representing a particular content item, a particular theatre and related temporal data and associating identification of said user along with said recorded user data;
   e) determining a number of users having selected identical identification of a theatre, a particular content item and related temporal data,
   f) determining whether to store scheduling information by comparing said number of users having selected identical identification of a theatre, a particular content item and related temporal data with a predetermined threshold, and
   g) storing said scheduling information when said number exceeds said threshold.

25. The non-transitory computer readable medium of claim 24 wherein said temporal data includes identification of a particular month and day.

26. The non-transitory computer readable medium of claim 24 in which said method further includes distributing selected data from said scheduling information.

27. The non-transitory computer readable medium of claim 26 wherein said selected data is distributed to a user selected from users associated with said selected data.

28. The non-transitory computer readable medium of claim 26 wherein said selected data is distributed to at least one exhibitor related to a theatre identified in said selected data.

29. The non-transitory computer readable medium of claim 26 wherein said selected data is distributed to at least one social networking site related to a user associated with said selected data.

30. The non-transitory computer readable medium of claim 26 wherein said selected data is distributed to at least one specialty site related to the content associated with said selected data.

31. The system of claim 1 which further includes means for enabling users to browse the first database.

* * * * *